United States Patent [19]

Severson et al.

[11] 3,873,482

[45] Mar. 25, 1975

[54] PYROLYZED TALL OIL PRODUCTS AS SYNTHETIC RUBBER TACKIFIERS

[75] Inventors: Ray F. Severson; Walter H. Schuller, both of Lake City, Fla.

[73] Assignee: The United States of America as represented by the Secretary of Agriculture, Washington, D.C.

[22] Filed: July 26, 1973

[21] Appl. No.: 382,793

[52] U.S. Cl.............. 260/27 R, 260/97.5, 260/413
[51] Int. Cl............................................. C08d 9/12
[58] Field of Search................. 260/97.5, 413, 27 R

[56] References Cited
OTHER PUBLICATIONS

"Encyclopedia of Chem. Technology," Dec. 1953, pp. 781 & 785 relied on.

Can. J. Chem. 49, (pp. 4027–4032 relied on), 1971.

*Primary Examiner*—Donald E. Czaja
*Assistant Examiner*—William E. Parker
*Attorney, Agent, or Firm*—M. Howard Silverstein; Max D. Hensley

[57] ABSTRACT

Acidified tall oil soap, tall oil middle cut and tall oil fatty acids can be pyrolyzed at 400° to 700°C on Vycor glass in a hot tube to yield products which enhance the building tack of synthetic SBR rubber.

3 Claims, No Drawings

PYROLYZED TALL OIL PRODUCTS AS SYNTHETIC RUBBER TACKIFIERS

A non-exclusive, irrevocable, royalty-free license in the invention herein described, throughout the world for all purposes of the United States Government, with the power to grant sublicenses for such purposes, is hereby granted to the Government of the United States of America.

This invention relates to a process by which commercial tall oil materials are pyrolyzed in a hot tube to yield products which when added to synthetic rubber composition improve its tack. More specifically, the invention concerns products obtained from the hot tube pyrolysis on Vycor Glass of acidified tall oil soap, tall oil middle cut, and tall oil fatty acids. The resulting pyrolysates can be incorporated with styrenebutadiene synthetic rubber at a 1 to 15 PHR (parts rosin derivative per hundred parts rubber) to yield a rubber with enhanced building tack.

Commercially available acified tall oil soap is the material obtained after sulfuric acid treatment of the black liquor soap obtained from the sulfate pulping of pine wood as described in "Modern Chemical Process, " Vol. VII, pp. 41–47, Reinhold Publishing Corporation, New York, N.Y. 1963. The tall oil middle cut is a cut containing resin acids (15–40%) and fatty acids (60–85%) obtained during the distillation of acidified tall oil. The tall oil fatty acid mixture is a commercial product containing oleic, linolenic and satured fatty acids with no more than 5.0% resin acids. Tall oil rosin is a commercial product containing less than 2.5% unsaponifiable material and fatty acids. Tall oil pitch is the pot residue after vacuum distillation of acidified tall oil.

The pyrolysis procedure applied to the tall oil materials employs a heated Vycor glass tube packed with Vycor rods (R. F. Severson, W. H. Schuller, and R. V. Lawrence, *Can. J. Chem.*, 49, 4028 (1971)). An inert gas, such as nitrogen, is employed as a carrier gas. Temperatures in the range of 400°–700°C can be employed at contact times from 1 to 20 seconds. The material can be added neat or in solution. A suitable solvent is benzene.

The data on the various tall oil pyrolysates is given in Table 1. For comparison purposes, since the tall oil rosin and tall oil pitch could not be readily added neat, the tall oil rosin, acidified soap, pitch and middle cut were pyrolyzed as benzene solutions.

The middle cut from distilled tall oil and the tall oil fatty acid fraction 500° and 600°C pyrolysates were found to be very effective rubber tackifiers at the 10 PHR level by the standard Monsanto Tel-Tak Test [(J. R. Beatty, *Rubber Chem. Technol.*, 42, 1040 (1969)]. Also, the 600° acidified tall oil soap pyrolysate showed some tackifier activity. Two commercial rosin oils commercially sold as rubber tackifiers were found to be less effective as rubber tackifiers than the tall oil middle cut, fatty acid and acidified soap pyrolysates. The tall oil rosin and tall oil pitch pyrolyzed under similar conditions were not effective as tackifying agents (see Table I). All materials before pyrolysis were found to be ineffective as rubber tackifiers at the 10 PHR level. A concentration time tack study (Table II) on the lower cost middle cut pyrolysate showed it to be effective at all contact times at 10 PHR level and at all concentrations tested with extended contact times.

The tackifier additives to synthetic rubber have no significant effect on the properties of the vulcanized polymer. Table III shows the effect of the addition of the middle cut 600° pyrolysate tackifier at the 5 PHR level on the properties of an SBR-1006 vulcanizate. The data would appear to indicate the tackifier has acted as a mild plasticizer with a small retarding of the cure rate [(W. S. Mueller et al., *Rubber Age*, 101, 43 (1969)].

EXAMPLE 1

A commercial tall oil middle cut (28.6% resin acids, acid no. 188.6) was pyrolyzed as follows:

Apparatus

The pyrolysis apparatus consisted of a vertically mounted Cenco Hevi-Duty Type 70-T electric combustion furnace with a 12-in. heating chamber containing a Vycor glass combustion tube (30 mm OD × 32 mm long) with a size 28/15 Vycor brand ball joint attached to the exit end. The combustion tube was randomly packed with approximately 1-in. lengths of one-eighth in. Vycor rod with a thermocouple (jacketed with a Vycor glass tube except for sensing tip) placed in the center of the heated area. A 24/40 female joint and the thermocouple leads were sealed at the top of the tube with a sealing cement which was coated with liquid silicate. A water condenser, ice trap, refluxing acetone dry ice trap, and two dry ice traps were connected in series to the exit port. A Temco portable indicating pyrometer (standardized by means of a Brown Model 117 Potentiometer) was used to monitor the pyrolysis tube temperature and a Thermolyn Furnatrol 133 Proportional Controller was used to maintain the desired temperature.

Pyrolysis

The system was allowed to equilibrate at 600°C under a nitrogen flow of 80 ml/min. One hundred grams of the tall oil middle cut in 250 ml of benzene was placed in a constant addition funnel and the solution was added at a constant rate over a period of 7.25 hours. The contact time, as calculated by equation (1), was determined to be about 5 seconds. The pyrolysate was collected and concentrated on a rotovac at a bath temperature of 30°C to a pressure of 40 mm Hg to yield 59 grams of product, acid no. 130.

$$(1)\ \tau\ (\text{sec.}) = \frac{(60)(273)V}{(22,410\ M/t + a)T} = \text{Contact time}$$

where: $V$, free volume of tube minus volume occupied by packing; $M$, moles of organic materials being pyrolyzed at atmospheric pressure; $t$, addition time in min; $a$, velocity of carrier gas ml/min (nitrogen); $T$, absolute temperature of pyrolysis tube. All calculations were made assuming ideal gas behavior.

EXAMPLES 2, 3, AND 4

Commercial tall oil rosin, pitch (acid no. 30) and acidified soap were pyrolyzed exactly as described in Example 1. Data on their pyrolysates is given in Table I.

EXAMPLE 5

Tall oil middle cut (150 g.) was pyrolyzed at 600°C (apparatus as given in Example 1) with a flow rate of 200 ml/min of nitrogen. The material was added neat over a period 2.75 hours. Data on product is given in Table I.

EXAMPLES 6, 7, AND 8

Tall oil middle cut, fatty acids (0.6% resin acids) and tall oil fatty acid methyl ester (prepared by the action of diazomethane) were pyrolyzed at 500°C as described in Example 5. Data on these pyrolysates is given in Table I

EXAMPLE 9

Tall oil fatty acids (150 g) were pyrolyzed at 600° (400 ml/min $N_2$) as described in Example 1. Addition time was 2.75 hours. Product is described in Table I.

EXAMPLES 10 AND 11

Tall oil fatty acids and middle cut were pyrolyzed at 400° (50 ml/min $N_2$) as described in Example 5. Data on these pyrolysates is given in Table I.

EXAMPLE 12

The tall oil pyrolysates as described in the Examples 1–11 were incorporated with styrene-butadiene synthetic rubber as follows, and evaluated as a rubber tackifier via the standard Monsanto Tel-Tak Test as described by J. R. Beatty, *Rubber Chem. Technol.*, 42, 1040 (1969).

| Test Formulation | PHR |
|---|---|
| SBR 1006 | 100.0 |
| HAF Black | 40.0 |
| Zinc Oxide | 5.0 |
| Stearic Acid | 2.0 |
| Tall Oil Pyrolysate Tackifier | 10.0 |

A control is run with each sample containing no added tackifier.

Monsanto Tel-Tak specimens were prepared by pressing the uncured rubber through a square woven aluminum screen in a tensile mold. The samples were pressed 5 minutes at 212°F. A sheet of parchment paper was placed on the side nearest the screen. A sheet of Mylor film was pressed against the test surface to be tested for tack. A one-fourth inch × 2 inch × 0.070 inch sample was used for the test. The Mylor was removed prior to testing. The conditions used were a 16 oz. preload for 60 seconds, pulled apart at 2 inches per minute. In all cases, by definition, the true tack is equal to the tack (rubber to rubber) minus the stickiness (rubber to metal). For comparison purposes, two commercial rosin oils designated as Comm. R. O. No. 1 and Comm. R. O. No. 2, in current commercial use as rubber tackifiers were also tested at the same concentration level. For the effect of comcentration and contact time studies (Table II), the tackifier was mixed into the control SBR at 2.5, 5.0, and 10.0 PHR levels.

RESULTS

| Sample | Test | Tack | Stickiness | True Tack |
|---|---|---|---|---|
| Set 1 | | | | |
| Pyrolyzed middle cut, 600°, neat | No. 1 | 31 | 21 | |
| | No. 2 | 28 | 30 | |
| | No. 3 | 34 | 23 | |
| | Av. | 31.00 PSI | 34.66 PSI | 6.34 PSI |
| Control | No. 1 | 28 | 22 | |
| | No. 2 | 27 | 19 | |
| | No. 3 | 24 | 25 | |
| | Av. | 26.33 PSI | 22.00 PSI | 4.33 PSI |
| Set 2 | | | | |
| Pyrolyzed middle cut, 600°, in benzene | No. 1 | 27.5 | 17.0 | |
| | No. 2 | 24.5 | 15.0 | |
| | No. 3 | 16.5 | 13.0 | |
| | Av. | 25.5 PSI | 15.0 PSI | 10.5 PSI |
| Control | No. 1 | 29.5 | 26.5 | |
| | No. 2 | 27.5 | 14.0 | |
| | No. 3 | 27.5 | 22.5 | |
| | Av. | 28.2 PSI | 21.0 PSI | 7.2 PSI |
| Set 3 | | | | |
| Pyrolyzed fatty acids, 600°, neat | No. 1 | 28.0 | 18.0 | |
| | No. 2 | 31.0 | 21.0 | |
| | No. 3 | 26.0 | 21.0 | |
| | Av. | 28.33 PSI | 20.00 PSI | 8.33 PSI |
| Control | No. 1 | 28.0 | 22.0 | |
| | No. 2 | 27.0 | 19.0 | |
| | No. 3 | 24.0 | 25.0 | |
| | Av. | 26.33 PSI | 22.00 PSI | 4.33 PSI |
| Set 4 | | | | |
| Commercial R.O. No. 1 | No. 1 | 32.0 | 18.0 | |
| | No. 2 | 30.0 | 22.5 | |
| | No. 3 | 31.0 | 27.0 | |
| | Av. | 31.0 PSI | 22.5 PSI | 8.5 PSI |
| Control | No. 1 | 28.5 | 20.5 | |
| | No. 2 | 28.0 | 18.0 | |
| | No. 3 | 30.0 | 22.0 | |
| | Av. | 28.0 PSI | 20.1 PSI | 8.6 PSI |
| Set 5 | | | | |
| Commercial R.O. No. 2 | No. 1 | 32.0 | 30.0 | |
| | No. 2 | 33.5 | 25.0 | |
| | No. 3 | 30.0 | 30.0 | |
| | Av. | 31.8 PSI | 27.5 PSI | 4.3 PSI |
| Control | No. 1 | 28.5 | 20.5 | |
| | No. 2 | 28.0 | 18.0 | |
| | No. 3 | 30.0 | 22.0 | |
| | Av. | 28.8 PSI | 20.2 PSI | 8.6 PSI |

EXAMPLE 13

All compounding for physical property measurements was done following ASTM milling procedures and the measurements were made according to ASTM procedures as given in Table III. The test formulas used in the testing are as given below. Results are given in Table III.

| Test Formulation | PHR |
|---|---|
| SBR 1006 | 100.0 |
| EPC Black | 40.0 |
| Zinc Oxide | 5.0 |
| Sulfur | 2.0 |
| Stearic Acid | 2.0 |
| Mercaptobenzothiozl disulfide | 1.5 |
| Pyrolyzed tall oil middle cut 600°, in Benzene | |

TABLE I

COMPARISON OF PYROLYSATES FROM TALL OIL FRACTIONS

| Tall Oil Fraction Pyrolyzed | Pyrolysis Temp. °C | Contact Time (sec.)[a] | % Recovery[b] | Acid No. Product | Tack Value[c] |
|---|---|---|---|---|---|
| Rosin[d] Acidified | 600 | 5.0 | 80 | 98 | −1.70 |
| Soap[d] | 600 | 5.0 | 59 | 93 | 0.10 |
| Pitch[d] | 600 | 5.0 | 67 | 0 | −3.50 |
| Middle Cut[d] | 600 | 5.0 | 60 | 130 | 3.30 |
| Middle Cut[e] | 600 | 7.0 | 51 | 192 | 2.10 |
| Middle Cut[e] | 500 | 8.0 | 88 | 170 | 1.77 |
| Middle Cut[e] | 400 | 15.0 | 100 | 184 | 0.33 |
| Fatty Acids[e] | 600 | 3.0 | 48 | 251 | 4.00 |
| Fatty Acids[e] | 500 | 8.0 | 93 | 188 | 1.00 |
| Fatty Acids[e] | 400 | 15.0 | 100 | 191 | −0.33 |
| Fatty Acids Methyl Ester[e] | 500 | 8.0 | 85.5 | 1.0 | −2.67 |

[a]Calculated using equation 1.
[b]Based on the material remaining after stripping the pyrolysate to 40 mm Hg at 30°C.
[c]Standardized tack data, true tack value of tackifier minus true tack value of control.
[d]Pyrolyzed by addition of the material in benzene (100 g in 250 ml).
[e]Added neat.

TABLE II

EFFECT OF TALL OIL MIDDLE CUT 600°C PYROLYSATE[a] TACKIFIER CONCENTRATIONS ON TACK STRENGTH WITH VARYING CONTACT TIME

| PHR Tackifier Added | 0 | 2.5 | 5.0 | 10.0 |
|---|---|---|---|---|
| Contact Time | \multicolumn{4}{c}{True Tack[b]} | | | |
| 60 sec. | −2.34 | 0.66 | −2.00 | 3.33 |
| 5 min. | −1.0 | 0.67 | 0.00 | 2.0 |
| 30 min. | 2.0 | 3.0 | 7.0 | 12.67 |
| 60 min. | 3.0 | 6.0 | 12.67 | 18.00 |

[a]Obtained by pyrolizing 100 g of tall oil middle cut in 275 ml benzene, contact time 5.0 sec.
[b]Defined as; true tack - tack (rubber to rubber) - stickiness (rubber to metal).

TABLE III

EFFECT OF TALL OIL MIDDLE CUT 600°C PYROLYSATE TACKIFIER ON PROPERTIES OF AN SBR-1006 VULCANIZATE

| | CONTROL | | | TACKIFIER | | |
|---|---|---|---|---|---|---|
| MOONEY SCORCH AND CURE DATA at 250°F | | | | | | |
| Minimum Viscosity | 37.0 | | | 30.0 | | |
| Δ 5, minutes | 34.0 | | | 41.5 | | |
| Δ 35, minutes | 49.0 | | | 81.5 | | |
| Δ 35–Δ 5, minutes | 15.0 | | | 39.5 | | |
| MOONEY SCORCH AND CURE DATA at 302°F | | | | | | |
| Minimum Viscosity | 35.0 | | | 28.5 | | |
| Δ 5, minutes | 5.5 | | | 6.5 | | |
| Δ 35, minutes | 7.0 | | | 9.5 | | |
| Δ 35–Δ 5, minutes | 1.5 | | | 3.0 | | |
| MOONEY PLASTICITY at 212°F Large Rotor ML1+4'/212°F | 54.0–54.5 | | | 41.0–41.5 | | |
| MONSANTO REOMETER, ASTM D2084, 3° Arc, Temp: 302°F, Preheat 30 Sec., 60 Min. Motor, Dies MPC 3 Cycles/min. | | | | | | |
| Min. Torque | 6.0 | | | 4.5 | | |
| Max. Torque | 91.0 | | | 61.0 | | |
| Scorch Time 2Pt + $t_{S2}$ | 5.0 | | | 8.0 | | |
| % $t_c$ (90) Cure Time | 43.0 | | | 49.5 | | |
| Cure, Minutes at 302°F | 15 | 30 | 60 | 15 | 30 | 60 |
| 100% Modulus, psi | 170 | 260 | 310 | 110 | 170 | 240 |
| 300% Modulus, psi | 670 | 1380 | 2060 | 290 | 870 | 1480 |
| Tensile Strength, psi | 1690 | 3160 | 3090 | 810 | 2580 | 2880 |
| Elongation, Percent | 590 | 550 | 410 | 680 | 610 | 460 |
| Hardness, Shore | 57 | 60 | 62 | 53 | 56 | 60 |
| Compression Set, 22 Hour, Percent | | | | | | |
| 158°F | | 19.75 | | | 21.49 | |
| 212°F | | 33.88 | | | 35.81 | |

We claim:

1. An improvement in tackifying vulcanized styrene-butadiene rubber, said improvement comprising incorporating into said rubber as tackifier a pyrolysate obtained by pyrolyzing an acidified tall oil soap in the presence of an inert gas at a temperature of about 400°C–700°C for about 1 to 20 seconds at from 1 to 15 parts pyrolysate per hundred parts of rubber.

2. An improvement in tackifying vulcanized styrene-butadiene rubber, said improvement comprising incorporating into said rubber as tackifier a pyrolysate obtained by pyrolyzing the middle cut of vacuum distilled acidified tall oil fatty acids in the presence of an inert gas at a temperature of 400°C–700°C for about 1 to 20 seconds, said middle cut containing about 15–40 weight percent resin acids and about 60–85 weight percent fatty acids, at from 1 to 15 parts pyrolysate per hundred parts of rubber.

3. An improvement in tackifying vulcanized styrene-butadiene rubber, said improvement comprising incorporating into said rubber as tackifier a pyrolysate obtained by pyrolyzing tall oil fatty acids containing not more than 5 weight percent rosin in the presence of an inert gas at a temperature of about 400°C–700°C for about 1 to 20 seconds, at from 1 to 15 parts pyrolysate per hundred parts of rubber.

* * * * *